United States Patent
Moriyama et al.

(10) Patent No.: US 8,972,059 B2
(45) Date of Patent: Mar. 3, 2015

(54) DISPLACEMENT CORRECTING METHOD AND DISPLACEMENT CORRECTING PROGRAM IN AUTOMATIC OPERATION SYSTEM

(75) Inventors: Hisashi Moriyama, Nishinomiya (JP); Takahiro Inada, Kakogawa (JP); Motonobu Sasaki, Akashi (JP); Shinji Kajihara, Kobe (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 523 days.

(21) Appl. No.: 12/801,211

(22) Filed: May 27, 2010

(65) Prior Publication Data
US 2010/0332032 A1 Dec. 30, 2010

(30) Foreign Application Priority Data
Jun. 1, 2009 (JP) .................. 2009-131981

(51) Int. Cl.
*B25J 9/10* (2006.01)
*B25J 9/16* (2006.01)
*B25J 13/08* (2006.01)

(52) U.S. Cl.
CPC .............. *B25J 9/1682* (2013.01); *B25J 9/1633* (2013.01); *B25J 13/085* (2013.01); *G05B 2219/39129* (2013.01); *G05B 2219/39176* (2013.01); *G05B 2219/45104* (2013.01); *Y10S 901/09* (2013.01)
USPC .............................. 700/258; 700/248; 901/9

(58) Field of Classification Search
CPC ...... B25J 11/00; B25J 11/005; B25J 11/0055; B25J 11/006; B25J 11/0065; B25J 11/007; B25J 11/0075; B25J 11/0095; B25J 13/08; B25J 13/081; B25J 13/082; B25J 13/083; B25J 13/084; B25J 13/085; B25J 13/088; B25J 13/089; B25J 15/0052; B25J 9/0084; B25J 9/0087; B25J 9/1633; B25J 9/1638; B25J 9/1641; B25J 9/1669; B25J 9/1682; B25J 9/1692; G05B 2219/39129; G05B 2219/39176; G05B 2219/45104
USPC .......... 700/258, 245, 247–249; 901/2–6, 8–9, 901/41–42
See application file for complete search history.

(56) References Cited

U.S. PATENT DOCUMENTS 6,131,457 A * 10/2000 Sato ........................... 73/514.31
2005/0172481 A1* 8/2005 Herrmann et al. ............... 29/715
(Continued)

FOREIGN PATENT DOCUMENTS

JP A-04-322995 11/1992
JP A-2004-330206 11/2004
(Continued)

OTHER PUBLICATIONS

Apr. 2, 2013 Decision of Rejection issued in Japanese Patent Application No. 2009-131981 (with English translation).

*Primary Examiner* — Jerrah Edwards
(74) *Attorney, Agent, or Firm* — Oliff PLC (57) ABSTRACT

In an automatic operation system including: a positioning robot having a holding tool and an inertial sensor at a tip end portion of an arm thereof; a working robot having an operation tool at a tip end portion of an arm thereof; and a robot control device, a positioning correcting method of the present invention includes: conveying and positioning the holding tool, which holds a work, by the positioning robot at a positioning reference position of the holding tool corresponding to an operation position of the work; detecting a displacement amount of the holding tool from the positioning reference position by the robot control device based on an inertial force of the inertial sensor when the working robot carries out a predetermined operation with respect to the work; and correcting based on the detected displacement amount the positioning reference position of the holding tool to a position of the holding tool before the holding tool is displaced.

8 Claims, 5 Drawing Sheets

(56) References Cited

U.S. PATENT DOCUMENTS

2006/0132078 A1* 6/2006 Iwashita et al. .......... 318/568.18
2007/0288124 A1 12/2007 Nagata et al.
2009/0001056 A1* 1/2009 Takahashi et al. ........... 219/86.7

FOREIGN PATENT DOCUMENTS

| JP | A-2005-144615 | 6/2005 |
|---|---|---|
| JP | A-2007-160437 | 6/2007 |
| WO | WO 2006/022201 A1 | 3/2006 |

* cited by examiner

DISPLACEMENT CORRECTING METHOD AND DISPLACEMENT CORRECTING PROGRAM IN AUTOMATIC OPERATION SYSTEM

BACKGROUND OF THE INVENTION

1. Field of the Invention

The present invention relates to a displacement correcting method and a displacement correcting program in an automatic operation system in which a positioning robot and a working robot carry out a cooperative operation.

2. Description of the Related Art

An industrial robot is configured such that: various tools are attached to a tip end portion of a robot arm; and a plurality of arm members constituting the robot arm can individually rotate about respective rotation axes thereof. To be specific, the industrial robot can stop the tool at a desired position in a desired posture by controlling rotational positions of respective rotation axes of the plurality of arm members and can move the tool along a desired route at a desired speed by controlling angular velocities of respective rotation axes of the plurality of arm members.

Figure 5:
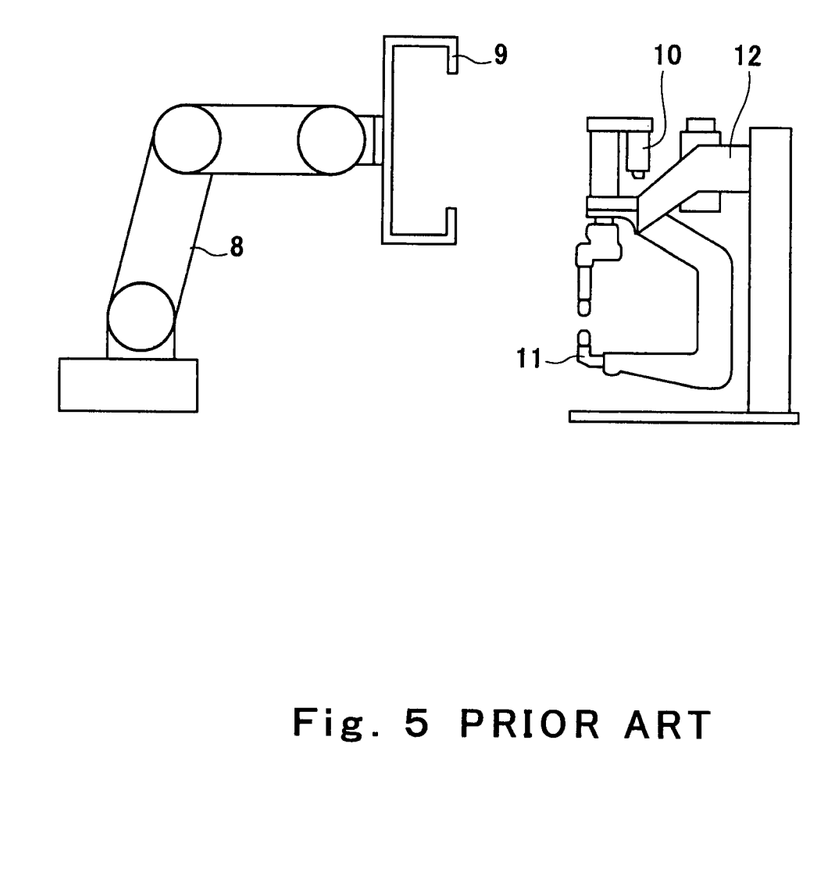
FIG. 5 is a diagram showing the configurations of an articulated robot and a spot welding gun robot in a spot welding system.

The industrial robots are widely utilized for the automation of various operations, such as a welding operation, a painting operation, a deburring operation, and a polishing operation. For example, proposed is a spot welding system in which an articulated robot (positioning robot) and a spot welding gun robot (working robot) operate together to automatically carry out spot welding in a spot welding line step (see Japanese Laid-Open Patent Application Publication No. 2004-330206). FIG. 5 is a diagram showing the configurations of the articulated robot and the spot welding gun robot.

As shown in FIG. 5, a work grasping hand (holding tool) 9 is attached to an articulated robot 8, and the work grasping hand 9 grasps (holds) a work (not shown) to carry out a handling operation. Then, each of welding points of the work grasped by the articulated robot 8 is positioned between welding electrodes of a spot welding gun 11 of a spot welding gun robot 12. After that, one of the welding electrodes of the spot welding gun 11 applies the pressure to the work by an electric servo mechanism to carry out the welding operation with respect to the work. Therefore, the spot welding gun 11 applies the pressure to the work to carry out a desired welding operation with respect to the work.

SUMMARY OF THE INVENTION

The welding point of the work is positioned between the welding electrodes of the spot welding gun 11 by a positioning operation of the articulated robot 8. However, actually, a displacement of the welding point may occur.

For example, before the work and the welding electrode contact each other, the displacement of the welding point may occur due to positioning deviations of the articulated robot 8 and the spot welding gun robot 12. Possible major factors of the positioning deviation are a deviation at the time of teaching, a deviation at the time of positioning control, a backlash of a motor shaft of each joint portion, and a robot machine difference (a case where various parameters at the time of off-line teaching are different from values of an actual machine).

Further, after the work and the welding electrode contact each other, deflections of the articulated robot 8 (especially, a reducer portion and an arm portion), the work, the spot welding gun robot 12, and an arm portion (especially, a fixed electrode portion) of the spot welding gun 11 occur due to a load and external force applied to the work (welding pressure of the welding electrode of the spot welding gun 11). Thus, the displacement of the welding point may occur.

Since the automatic operation system, such as the conventional spot welding system, does not include a mechanism configured to detect an operation position displacement which may occur at the time of a predetermined operation, the operation position displacement needs to be visually confirmed by a worker. In a case where the operation position displacement is visually confirmed, the position is manually corrected point by point. Therefore, negative effects, such as reductions in productivity and quality, may be caused.

Here, an object of the present invention is to detect and correct, by a simple mechanism, the operation position displacement which may occur when the positioning robot and the working robot carry out the cooperative operation in the automatic operation system.

The present invention was made in light of the above circumstances. To solve the above problems, a major aspect of the present invention is a displacement correcting method in an automatic operation system, the automatic operation system including: a positioning robot having a first robot arm and a holding tool provided at a tip end portion of the first robot arm; a working robot having a second robot arm and an operation tool provided at a tip end portion of the second robot arm; an inertial sensor provided at the tip end portion of the first robot arm, the tip end portion of the second robot arm, or a work held by the holding tool of the positioning robot; and a robot control device, the positioning robot conveying and positioning the work, held by the holding tool, at a positioning reference position that is a predetermined target position of the positioning robot, the working robot carrying out a predetermined operation with respect to the work at an operation position that is a predetermined target position of the working robot, wherein: the robot control device controls an operation of the positioning robot; and the robot control device executes a displacement amount detecting step of detecting a displacement amount of the holding tool from the positioning reference position based on an inertial force detected by the inertial sensor when the working robot carries out the predetermined operation with respect to the work and a displacement correcting step of correcting based on the detected displacement amount the positioning reference position of the holding tool to a position of the holding tool before the holding tool is displaced.

When the positioning robot and the working robot cooperatively carry out a predetermined operation with respect to the work, the operation position of the work may be displaced from the proper target position by the load and external force applied to the work. However, by the above steps, the displacement amount of the holding tool from the positioning reference position can be detected using the inertial force detected by the inertial sensor attached to the positioning robot or the working robot, and the displacement of the holding tool can be corrected.

To solve the above problems, another major aspect of the present invention is a displacement correcting method in an automatic operation system, the automatic operation system including: a positioning robot having a first robot arm and a holding tool provided at a tip end portion of the first robot arm; a working robot having a second robot arm and an operation tool provided at a tip end portion of the second robot arm; an inertial sensor provided at the tip end portion of the first robot arm, the tip end portion of the second robot arm, or a work held by the holding tool of the positioning robot; and a robot control device, the positioning robot conveying and positioning the work, held by the holding tool, at a positioning reference position that is a predetermined target position of the positioning robot, the working robot carrying out a predetermined operation with respect to the work at an operation position that is a predetermined target position of the working robot, wherein: the robot control device controls an operation of the working robot; and the robot control device executes a displacement amount detecting step of detecting a displacement amount of the working robot from the operation position based on an inertial force detected by the inertial sensor when the working robot carries out the predetermined operation with respect to the work and a displacement correcting step of correcting based on the detected displacement amount the operation position to a position of the working robot after the working robot is displaced.

By the above steps, the displacement amount from the operation position can be detected using the inertial force detected by the inertial sensor attached to the positioning robot or the working robot, and the displacement of the operation position of the working robot can be corrected.

It is preferable that the positioning robot be one of a plurality of positioning robots. In the case of the automatic operation system in which a plurality of positioning robots cooperatively convey the work to the target position, the inertial forces detected by a plurality of inertial sensors can be used, so that the displacement amount of the holding tool can be detected with high accuracy.

The inertial sensor may be an acceleration sensor, and the displacement amount detecting step may be a step of detecting, based on an acceleration in a translational direction or a rotational direction detected by the acceleration sensor, the displacement amount in the translational direction or the rotational direction from the positioning reference position of the holding tool up to a position of the holding tool after the holding tool is displaced. With this, in a case where the holding tool moves only in the translational direction or rotational direction, the displacement amount of the holding tool can be easily detected by the acceleration sensor.

The acceleration sensor may be a sensor configured to detect the accelerations in directions of three dimensions, and the displacement amount detecting step may be a step of detecting, based on the acceleration in the translational direction in each of the directions of three dimensions detected by the acceleration sensor, the displacement amount in the directions of three dimensions from the positioning reference position of the holding tool up to the position of the holding tool after the holding tool is displaced. With this, in a case where the holding tool moves in any direction, the displacement amount of the holding tool of an orthogonal 3D coordinate system can be easily detected.

The inertial sensor may be an angular velocity sensor, and the displacement amount detecting step may be a step of detecting, based on an angular velocity in a rotational direction detected by the angular velocity sensor, the displacement amount in the rotational direction from the positioning reference position of the holding tool up to a position of the holding tool after the holding tool is displaced. With this, in a case where the holding tool moves in any direction, the displacement amount of the holding tool of the orthogonal 3D coordinate system can be easily detected.

In accordance with the present invention, the displacement occurring in the cooperative operation carried out by the positioning robot and the working robot in the automatic operation system can be detected and corrected by a simple mechanism.

The above object, other objects, features and advantages of the present invention will be made clear by the following detailed explanation of preferred embodiments with reference to the attached drawings.

DESCRIPTION OF THE PREFERRED EMBODIMENTS

Hereinafter, preferred embodiments of the present invention will be explained in reference to the drawings. In the following description and drawings, the same reference numbers are used for the same or corresponding components, and a repetition of the same explanation is avoided.

Embodiment 1

Figure 1:
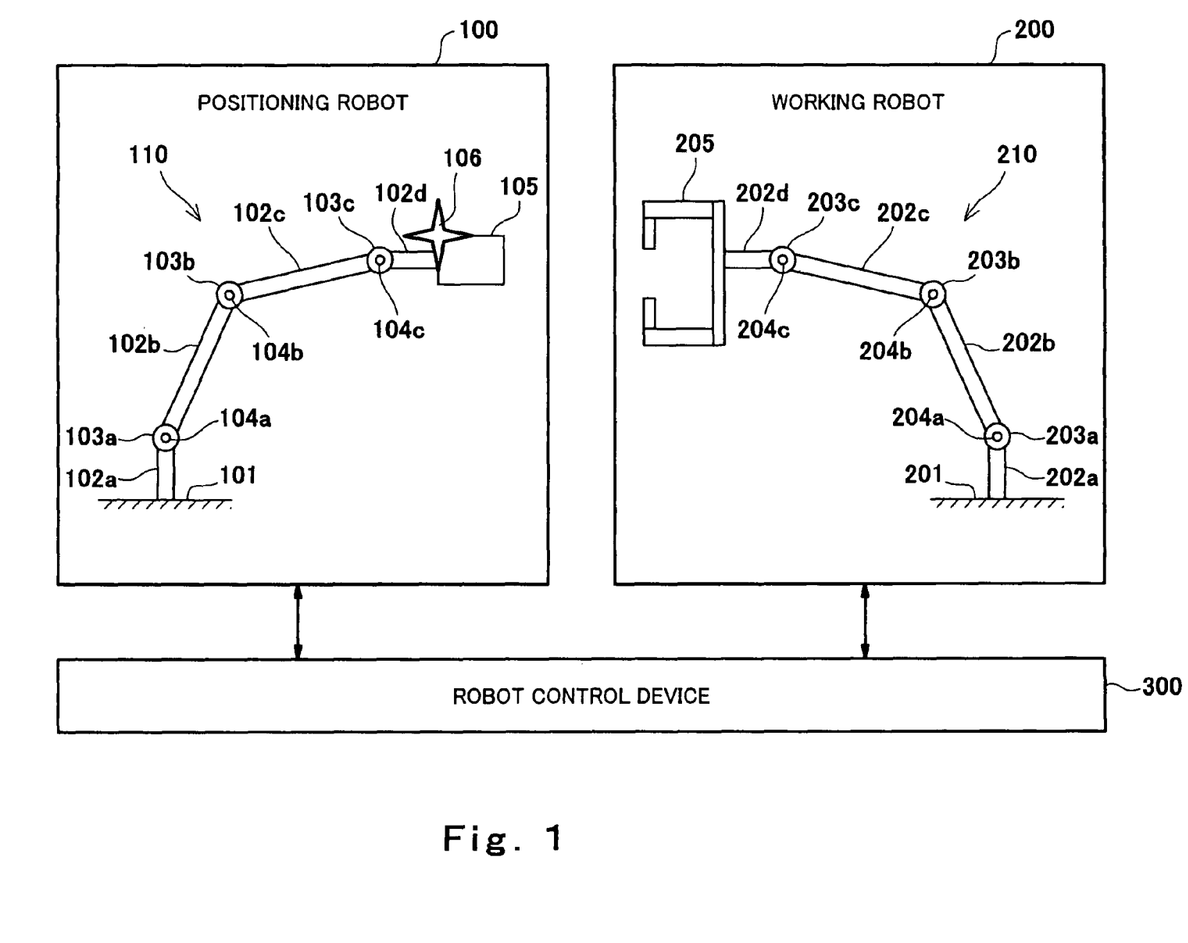
FIG. 1 is a diagram showing the entire configuration of an automatic operation system according to Embodiment 1 of the present invention.

FIG. 1 is a diagram showing the entire configuration of an automatic operation system according to Embodiment 1 of the present invention. The automatic operation system shown in FIG. 1 includes a positioning robot 100, a working robot 200, and a robot control device 300. The automatic operation system is a system configured to automatically execute a series of steps of conveying and positioning a predetermined work at a predetermined target position of the working robot 200 by the positioning robot 100 and carrying out a predetermined operation with respect to the work by the working robot 200. Examples of an intended operation step of the present automatic operation system are a spot welding step, a painting step, a deburring step, and a polishing step.

The positioning robot 100 is a so-called floor-standing vertical articulated robot configured such that a base 101 thereof is placed on a floor surface under a working space. Arms (hereinafter referred to as "arm members", for convenience sake) 102a, 102b, 102c, and 102d are provided at the base 101 so as to be connected to one another. Moreover, the base 101 and the arm members 102a to 102d are coupled to one another through, for example, joints 103a, 103b, and 103c so as to be relatively rotatable. For example, by a joint (not shown) that is a portion where the base 101 and the arm member 102a are coupled to each other, each of the base 101 and the arm member 102a relatively rotates (turns) about an axis perpendicular to a shaft center thereof. Moreover, each of the arm members 102a and 102b relatively rotates about a shaft center thereof by the joint 103a, each of the arm members 102b and 102c relatively rotates about a shaft center thereof by the joint 103b, and each of the arm members 102c and 102d relatively rotates about a shaft center thereof by the joint 103c. Hereinafter, a group of arm members connected to one another by joints in this manner is defined as a robot arm.

Herein, a group of arm members 102a to 102d connected to one another by the joints 103a to 103c constitutes a robot arm 110 (first robot arm).

The joint 103a is provided with an actuator 104a including a servo motor (not shown) configured to drive the actuator 104a and an encoder (position detector) coupled to a main shaft of the servo motor. The rotation about the rotation axis, which is allowed by the joint 103a, is carried out by the operation of the servo motor of the actuator 104a. Moreover, the encoder of the actuator 104a detects a rotation angle (hereinafter referred to as an "encoder value θa") of the servo motor of the actuator 104a from a reference position (reference angle). The encoder value θa corresponds to a current position of the joint 103a on control of the joint 103a. As with the joint 103a, the joint 103b is provided with an actuator 104b including the servo motor and the encoder, and the joint 103c is provided with an actuator 104c including the servo motor and the encoder.

A holding tool 105 for various operations is detachably attached to a tip end portion of the arm member 102d (tip end portion of the robot arm 110). Examples of the holding tool 105 are a grasping tool and an adsorbing tool for a conveying operation. In a case where the holding tool 105 is attached to the tip end portion of the arm 102d, the holding tool 105 is not relatively displaced with respect to the arm 102d. Moreover, an inertial sensor 106 is attached to the tip end portion of the arm 102d. In a case where the holding tool 105 is always attached to the tip end portion of the arm 102d, the inertial sensor 106 may be attached to the holding tool 105. Alternatively, the inertial sensor 106 may be provided at the work held by the holding tool 105 of the positioning robot 100.

The inertial sensor 106 is a sensor configured to detect as an electric signal an inertial force generated from the movement of an object (in this case, the holding tool 105). Examples of the inertial sensor 106 are an acceleration sensor and an angular velocity sensor. A representative example of the acceleration sensor is a mechanism in which when the inertial force is applied to a piezoelectric element by a mass held in a hollow state inside a ceramic case, an electric charge generated at the piezoelectric element is obtained as the electric signal. A uniaxial acceleration sensor is used when detecting only the acceleration of the holding tool 105 in a translational direction or a rotational direction, and a triaxial acceleration sensor is used when detecting the accelerations in triaxial (X-axis, Y-axis, and Z-axis in an orthogonal 3D coordinate system) directions of the holding tool 105. A representative example of the angular velocity sensor is a mechanism in which when a voltage is applied to the piezoelectric element, and the angular velocity by the rotational movement is further applied to the vibrating piezoelectric element, a distortion of the piezoelectric element caused by a so-called Coriolis force is obtained as the electric signal.

Moreover, in a case where the inertial sensor 106 has directivity, a most sensitive direction of the inertial sensor 106 is set to a direction in which the distortion most strongly occurs in the actual cooperative operation carried out by the positioning robot 100 and the working robot 200.

As with the positioning robot 100, the working robot 200 is a so-called floor-standing vertical articulated robot configured such that a base 201 thereof is placed on the floor surface under the working space. Arms (hereinafter referred to as "arm members", for convenience sake) 202a, 202b, 202c, and 202d are provided at the base 201 so as to be connected to one another. Moreover, the base 201 and the arm members 202a to 202d are coupled to one another through, for example, joints 203a, 203b, and 203c so as to be relatively rotatable. For example, by a joint (not shown) that is a portion where the base 201 and the arm member 202a are coupled to each other, each of the base 201 and the arm 202a relatively rotates (turns) about an axis perpendicular to a shaft center thereof. Moreover, each of the arm members 202a and 202b relatively rotates about a shaft center thereof by the joint 203a, each of the arm members 202b and 202c relatively rotates about a shaft center thereof by the joint 203b, and the arm members 202c and 202d relatively rotates about a shaft center thereof by the joint 203c. A group of arm members 202a to 202d connected to one another by the joints 203a to 203c constitutes a robot arm 210 (second robot arm).

The joint 203a is provided with an actuator 204a including a servo motor (not shown) configured to drive the actuator 204a and an encoder (position detector) coupled to a main shaft of the servo motor. The rotation about the rotation axis, which is allowed by the joint 203a, is carried out by the operation of the servo motor of the actuator 204a. Moreover, the encoder of the actuator 204a detects a rotation angle (hereinafter referred to as an "encoder value θb") of the servo motor of the actuator 204a from a reference position (reference angle). The encoder value θb corresponds to a current position of the joint 203a on control of the joint 203a. As with the joint 203a, the joint 203b is provided with an actuator 204b including the servo motor and the encoder, and the joint 203c is provided with an actuator 204c including the servo motor and the encoder.

An operation tool 205 for various operations is detachably attached to a tip end portion of the arm member 202d (tip end portion of the robot arm 210). Examples of the operation tool 205 are a spot welding gun and welding torch for the welding operation, and a barrel finishing machine, brush finishing machine, and air blast finishing machine for the deburring and polishing operations. In a case where the operation tool 205 is attached to the tip end portion of the arm member 202d, the operation tool 205 is not relatively displaced with respect to the arm member 202d.

The robot control device 300 is a control device configured to control the operations of both the positioning robot 100 and the working robot 200 in accordance with the intended operation steps of the present automatic operation system. Specifically, the robot control device 300 causes the holding tool 105 of the positioning robot 100 and the operation tool 205 of the working robot 200 to move along any route to any position in any posture by servo control of the servo motors of the actuators 104a to 104c of the positioning robot 100 and servo control of the servo motors of the actuators 204a to 204d of the working robot 200. Further, the robot control device 300 controls the holding of the work by the holding tool 105 of the positioning robot 100 and the operation with respect to the work by the operation tool 205 of the working robot 200. The robot control device 300 may be constituted by a robot control device configured to control only the positioning robot 100 and a robot control device configured to control only the working robot 200.

The robot control device 300 is provided at the base 101 of the positioning robot 100 or the base 201 of the working robot 200. However, the robot control device 300 may be provided away from the positioning robot 100 and the working robot 200. Moreover, the robot control device 300 may be physically detachably connected to the positioning robot 100 or the working robot 200. Further, the robot control device 300 can be connected to an external device (not shown), such as a teach pendant. An operator can utilize the external device to carry out, for example, an input of a start command of a teach mode (mode of teaching a movement end position (target position) of the robot) or a check mode (mode of checking the movement of the robot which has moved based on the teach mode), a manual operation of the positioning robot 100 or the working robot 200 during the teach mode, an input of a movement start position (initial position) or a movement end position (target end position) during the teach mode, and the like.

Figure 2:
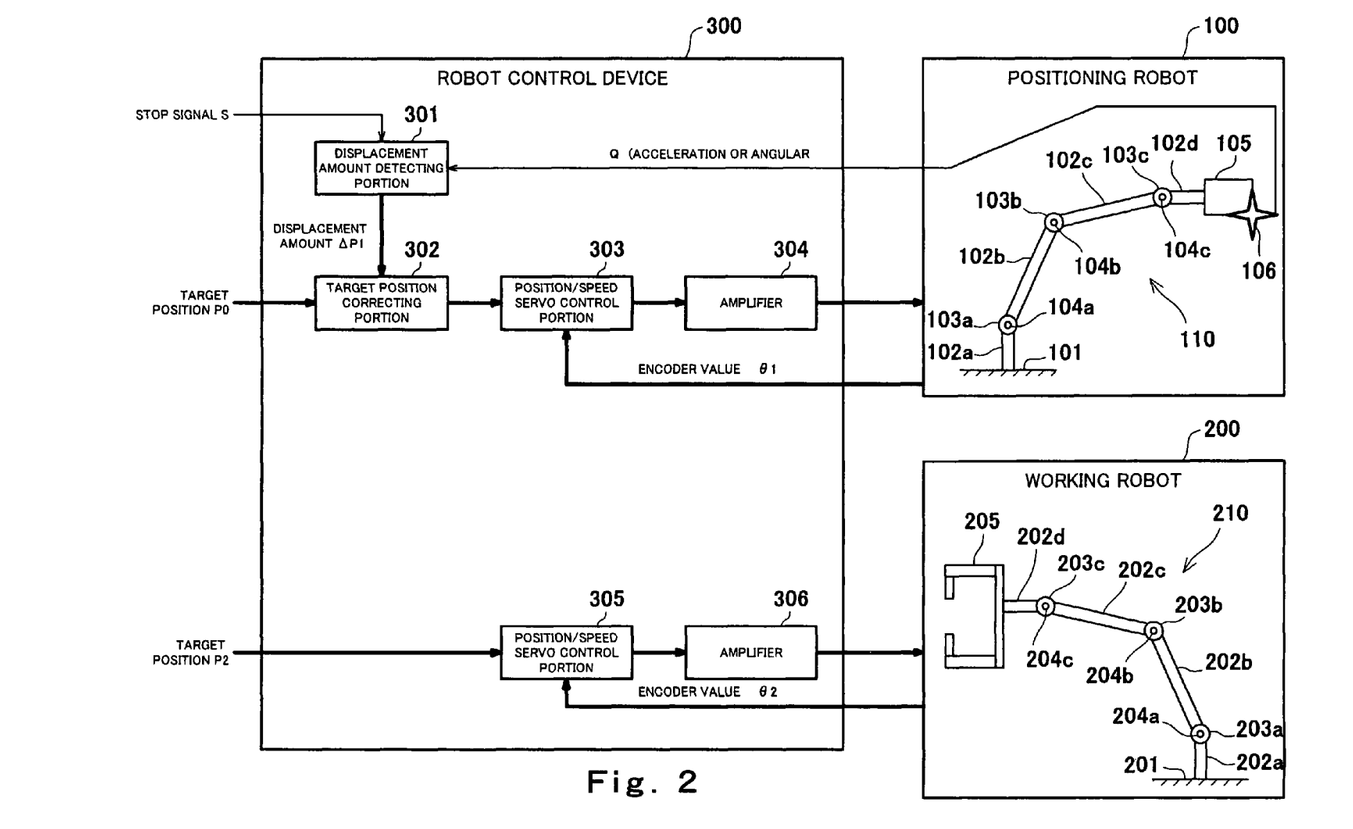
FIG. 2 is a diagram showing the block configuration of a robot control device according to Embodiment 1 of the present invention.

FIG. 2 is a functional block diagram showing the functional configuration of the robot control device 300 of the automatic operation system shown in FIG. 1. As shown in FIG. 2, the robot control device 300 includes a displacement amount detecting portion 301, a target position correcting portion 302, a position/speed servo control portion 303, an amplifier 304, a position/speed servo control portion 305, and an amplifier 306. Each of the displacement amount detecting portion 301, the target position correcting portion 302, and the position/speed servo control portion 303 is realized as a functional block by a program (software) executed by a CPU (not shown) of the robot control device 300. Of course, each of these functional blocks may be realized by hardware, such as an electric circuit.

After the positioning robot 100 conveys and positions the holding tool 105 at a predetermined positioning reference position Pn of the working robot 200, the displacement amount detecting portion 301 detects, based on an inertial force Q (indicating the acceleration or the angular velocity) of the inertial sensor 106, a displacement amount ΔP1 that is the amount of displacement of the holding tool 105 from the positioning reference position Pn by the external force applied in a predetermined operation. The displacement amount ΔP1 denotes a displacement between the current position of the holding tool 105 on control of the holding tool 105 (positioning reference position Pn) and an actual position P1 of the holding tool 105 which has been positioned. The displacement amount detecting portion 301 receives a stop signal S indicating that the holding tool 105 has been positioned at the positioning reference position Pn. When the stop signal S is input, the displacement amount detecting portion 301 starts detecting the displacement amount ΔP1. In a case where the inertial force Q indicates the acceleration, the displacement amount ΔP1 of the holding tool 105 based on the inertial force Q is detected by obtaining a movement distance of the holding tool 105 by a second order integration of the inertial force Q. Moreover, in a case where the inertial force Q indicates the angular velocity, the displacement amount ΔP1 is detected by a first order integration of the inertial force Q. In this case, the displacement amount ΔP1 indicates a displacement (angle change amount) between a current angle of the holding tool 105 on control of the holding tool 105 and an actual angle (hereinafter referred to as a "real angle") of the holding tool 105 which has been positioned. In a case where the stop signal S is not input to the displacement amount detecting portion 301, the displacement amount detecting portion 301 outputs 0 as the displacement amount ΔP1.

The displacement amount ΔP1 mainly denotes the degree of the displacement caused by a load and external force applied to the holding tool 105 or the work held by the holding tool 105 when the working robot 200 carries out a predetermined operation with respect to a predetermined work held by the holding tool 105 after the holding tool 105 is positioned by the positioning robot 100. In the case of the spot welding system shown in FIG. 5, for example, the load and external force applied to the holding tool 105 is the welding pressure of one of welding electrodes of the spot welding gun.

The target position correcting portion 302 corrects a target position P0 (positioning reference position Pn), which is instructed by the above external device and is a conveyance destination of the holding tool 105, to a corrected target position P0' which is set in consideration of the displacement amount ΔP1 of the holding tool 105 detected by the displacement amount detecting portion 301. Specifically, the target position correcting portion 302 calculates "the target position P0 (positioning reference position Pn)+the displacement amount ΔP1" and outputs this as the corrected target position P0'. In a case where the stop signal S is not input to the displacement amount detecting portion 301, the displacement amount ΔP1 is 0. Therefore, the target position correcting portion 302 does not correct the target position P0 (positioning reference position Pn) and outputs the target position P0 as the corrected target position P0'.

The position/speed servo control portion 303 receives the corrected target position P0' output from the target position correcting portion 302 and an encoder value θ1 detected by the encoder of each of the actuators 104a to 104c of the positioning robot 100, and outputs a command value of an operation amount of the servo motor of each of the actuators 104a to 104c of the positioning robot 100. Specifically, as shown by Formula below, the position/speed servo control portion 303 calculates a difference e1 between the corrected target position P0' and the encoder value θ1, that is, a position error e1 of the holding tool 105 in consideration of the displacement amount ΔP1 of the holding tool 105, and outputs a signal obtained by amplifying the position error e1 by a predetermined gain. This operation is a so-called proportional action.

$$e1 = P0' - \theta1 = (P0 + \Delta P1) - \theta1 \quad \text{Formula 1}$$

Further, the position/speed servo control portion 303 calculates a difference v1 between a first derivation of the displacement amount ΔP1 and a first derivation of the encoder value θ1, that is, a velocity error v1 of the holding tool 105 in consideration of the displacement amount of the holding tool 105, and outputs a signal obtained by amplifying the velocity error v1 by a predetermined gain. This operation is a so-called differential action.

$$v1 = dP0'/dt - d\theta1/dt = (dP0/dt + d\Delta P1/dt) - d\theta1/dt \quad \text{Formula 2}$$

The position/speed servo control portion 303 may carry out a so-called integral action simultaneously with the proportional action and the differential action.

The amplifier 304 amplifies the signal output from the position/speed servo control portion 303 and outputs the amplified signal to the servo motor of each of the actuators 104a to 104c of the positioning robot 100 as a driving current command corresponding to the operation amount of the servo motor. The servo motor rotates in accordance with the driving current command, and feedback control is carried out such that the holding tool 105 is located at the corrected target position P0'.

The position/speed servo control portion 305 receives a target position P2 instructed by the external device and an encoder value θ2 detected by the encoder of each of the actuators 204a to 204c of the working robot 200, and outputs a command value of an operation amount of the servo motor of each of the actuators 204a to 204c of the working robot 200. Specifically, the position/speed servo control portion 305 calculates a position error e2 that is a difference between the target position P2 of the operation tool 205 and the encoder value θ2, and outputs a signal obtained by amplifying the position error e2 by a predetermined gain. This operation is a so-called proportional action.

$$e2 = P2 - \theta2 \quad \text{Formula 3}$$

Further, the position/speed servo control portion 305 calculates a velocity error v2 that is a difference between the first derivation of the target position P2 of the operation tool 205 and the first derivation of the encoder value θ2, and outputs a signal obtained by amplifying the velocity error v2 by a predetermined gain. This operation is a so-called differential action.

$$v2 = dP2/dt - d\theta 2/dt \qquad \text{Formula 4}$$

The position/speed servo control portion 305 may carry out the so-called integral action simultaneously with the proportional action and the differential action.

The amplifier 306 amplifies the signal output from the position/speed servo control portion 305 and outputs the amplified signal to the servo motor of each of the actuators 204a to 204c of the working robot 200 as the driving current command corresponding to the operation amount of the servo motor. The servo motor rotates in accordance with the driving current command, and the feedback control is carried out such that the operation tool 205 is located at the target position P2.

Figure 3:
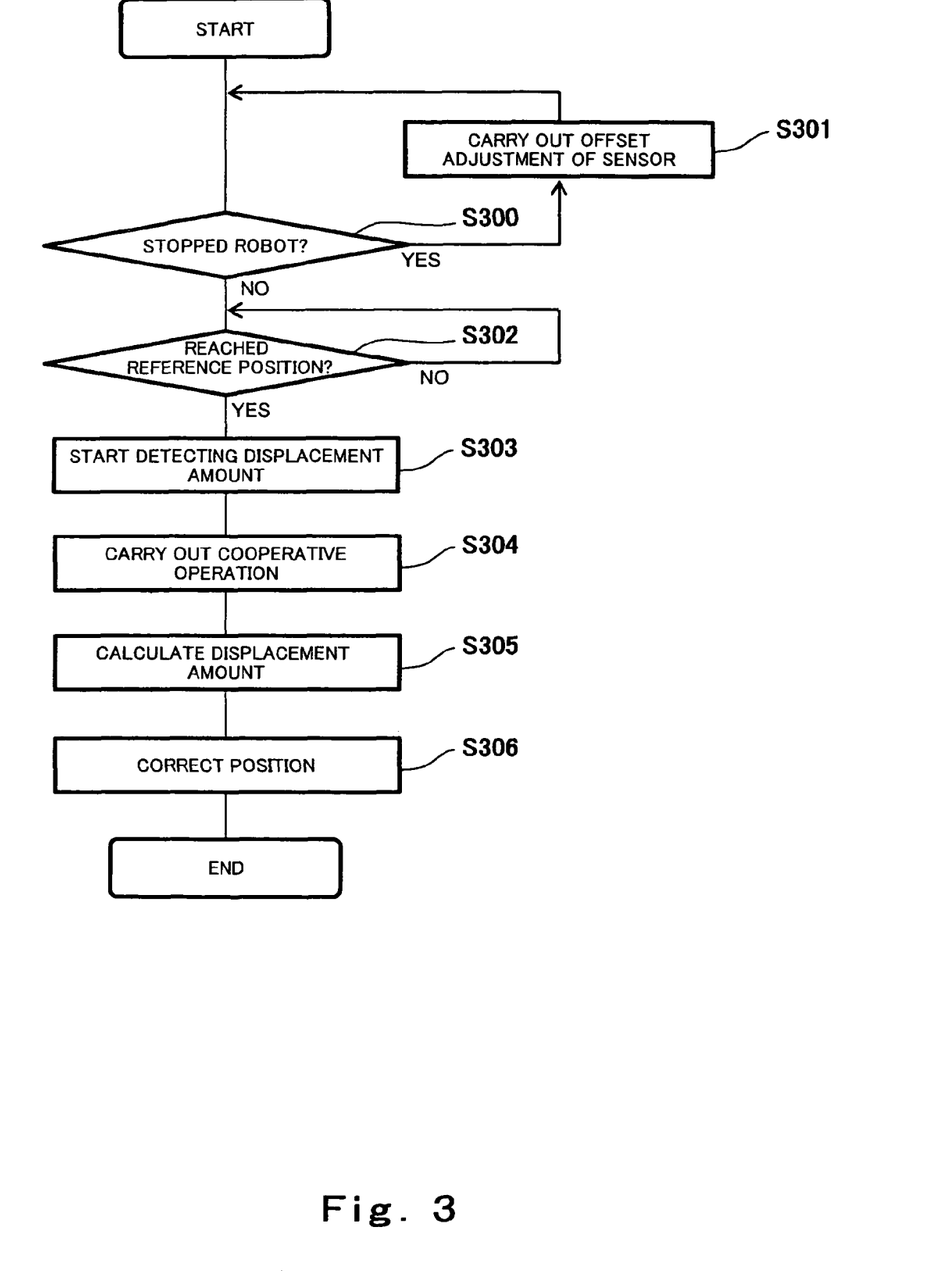
FIG. 3 is a flow chart for explaining the flow of a displacement correcting method according to Embodiment 1 of the present invention.

FIG. 3 is a flow chart for explaining a displacement correcting method for correcting the displacement of an operation position by the robot control device 300.

While the positioning robot 100 set at the initial position stops (YES in S300), the robot control device 300 carries out an offset adjustment of the inertial sensor 106 (S301). This is because in the case of detecting the displacement amount ΔP1 as described below, detection accuracy improves by removing the offset of the inertial sensor 106, and this improves displacement correction accuracy.

Next, after the offset adjustment of the inertial sensor 106, the robot control device 300 conveys and positions the work held by the holding tool 105 of the positioning robot 100 at the positioning reference position Pn (cooperative operation position recognized by the positioning robot 100) which is instructed by the external device and is the target position P0 of the operation tool 205 of the working robot 200 (NO in S300 and NO in S302). Then, when the holding tool 105 holding the work reaches the positioning reference position Pn (YES in S302), the displacement amount detecting portion 301 of the robot control device 300 starts the detection of the displacement amount ΔP1 of the work based on the inertial force Q detected by the inertial sensor 106 (S303). To be precise, when the work reaches the positioning reference position Pn, and the stop signal S is input, the robot control device 300 starts the detection of the movement distance of the holding tool 105.

Next, the robot control device 300 controls the cooperative operation (for example, the spot welding with respect to the work) carried out by the positioning robot 100 and the working robot 200 (S304). In the cooperative operation, the load and external force may be applied to the work as described above, and the work positioned at the positioning reference position Pn corresponding to the target position P0 may move. Here, in the robot control device 300, the displacement amount detecting portion 301 detects the displacement amount ΔP1 that is the amount of displacement of the work from the positioning reference position Pn (S305), and the target position correcting portion 302 corrects the positioning reference position Pn corresponding to the target position P0, which is instructed by the external device and is the conveyance destination of the holding tool 105, to the corrected target position P0' which is set in consideration of the displacement amount ΔP1 of the holding tool 105 detected by the displacement amount detecting portion 301. Then, the position/speed servo control portion 303 of the robot control device 300 controls the servo motors of the actuators 204a to 204c of the positioning robot 100 based on the corrected target position P0' so as to eliminate the displacement amount ΔP1. As a result, the actual position P1 of the holding tool 105 is corrected to the position P0 that is a position before the displacement such that the displacement amount ΔP1 is eliminated (S306). After the holding tool 105 of the positioning robot 100 holds the work, the holding tool 105 receives the load in the direction of gravitational force. Therefore, before conveying the holding tool 105 to the target position, the position of the holding tool 105 may be corrected.

As described above, in Embodiment 1, in a case where the positioning robot 100 and the working robot 200 cooperatively carry out a predetermined operation with respect to the work, and the work moves, by the load and external force, from the positioning reference position Pn that is the proper predetermined target position P0 of the holding tool 105 holding the work, the displacement amount ΔP1 can be detected, and the displacement of the holding tool 105 can be corrected. Moreover, by focusing on the point that the positioning robot 100 holds the work, a simple configuration may be adopted, in which in order to correct the displacement, the inertial sensor 106 is attached to only the positioning robot 100, and only the inertial force Q detected by the inertial sensor 106 is utilized. Further, an existing automatic operation system includes a configuration for the servo control of the holding tool 105 of the positioning robot 100 and the servo control of the operation tool 205 of the working robot 200. Therefore, the displacement correction using the displacement amount ΔP1 can be realized by using the configuration of the existing automatic operation system.

Embodiment 2

In Embodiment 1, the inertial sensor 106 is attached to the tip end portion of the robot arm 110 of the positioning robot 100, the displacement amount ΔP1 of the work, which is held by the holding tool 105, from the positioning reference position Pn is detected based on the inertial force Q detected by the inertial sensor 106, and the displacement correction using the displacement amount ΔP1 is carried out. With this, since the displacement correction using the displacement amount ΔP1 is completed in the positioning robot 100, the configuration necessary for the displacement correction can be simplified.

In Embodiment 2, the inertial sensor 106 is attached to the tip end portion of the robot arm 110 of the positioning robot 100, and a positioning reference position Pm (cooperative operation position recognized by the working robot 200) which corresponds to the operation position of the work and is the target position P2 of the operation tool 205 is corrected, based on the inertial force Q detected by the inertial sensor 106, to the actual position of the work which is the position displaced from the positioning reference position Pn of the holding tool 105 by the displacement amount ΔP1. To be specific, unlike Embodiment 1, in the displacement correction of the operation position in Embodiment 2, the holding tool 105 of the positioning robot 100 is not moved but the operation tool 205 of the working robot 200 is moved. In this case, the deflection amount of the work may be registered in advance for each teaching point, and the information of the deflection amount may be considered.

As a result, in Embodiment 2, the correction can be carried out while considering not only the displacement generated by the load and external force applied to the work in the cooperative operation carried out by the positioning robot 100 and the working robot 200 but also the deflection of the work, which is not considered in Embodiment 1.

Moreover, in the automatic operation system which requires a plurality of positioning robots 100, that is, in the automatic operation system in which the plurality of positioning robots 100 cooperatively convey the work to the positioning reference position Pn of the working robot 200, the inertial forces Q of the inertial sensors 106 of the plurality of positioning robots 100 can be utilized as the information for detecting the displacement amount of the holding tool 105, so that the displacement amount of the holding tool 105 can be detected with high accuracy.

Embodiment 3

Figure 4:
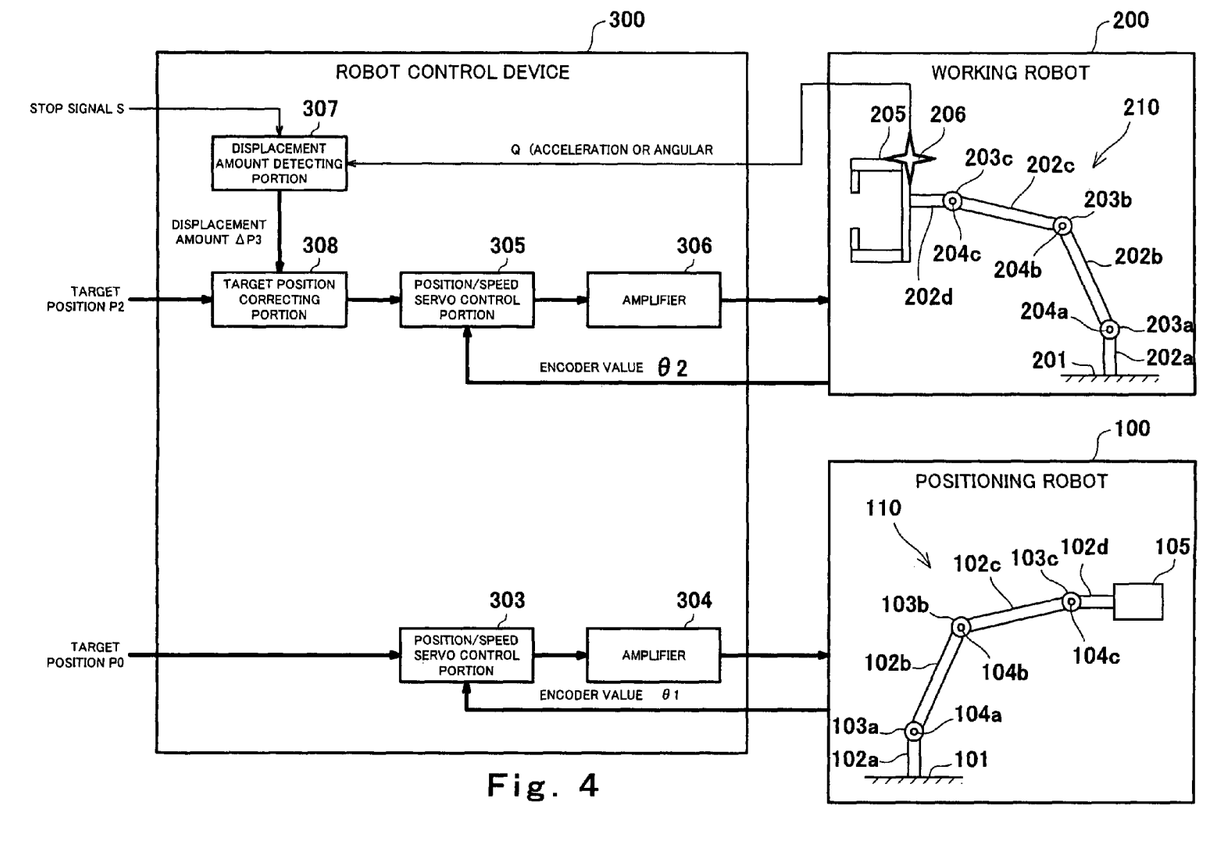
FIG. 4 is a diagram showing the block configuration of the robot control device according to Embodiment 3 of the present invention.

FIG. 4 is a diagram especially showing the block configuration of the robot control device 300 in the entire configuration of the automatic operation system according to Embodiment 3 of the present invention. Embodiment 3 is mainly different from Embodiment 1 shown in FIGS. 1 and 2 in that: the inertial sensor 106 at the tip end portion of the robot arm 110 of the positioning robot 100 is detached, and an inertial sensor 206 is attached to a tip end portion of a robot arm 210 of the working robot 200; and the displacement amount detecting portion 301 and the target position correcting portion 302 of the robot control device 300 are omitted from a servo control system which controls the positioning robot 100, and a displacement amount detecting portion 307 and a target position correcting portion 308 are added to a servo control system which controls the working robot 200.

As with the inertial sensor 106, the acceleration sensor, the angular velocity sensor, or the like can be used as the inertial sensor 206, and the inertial sensor 206 detects the acceleration, the angular velocity, or the like of the operation tool 205. Moreover, in a case where the inertial sensor 206 has the directivity, the most sensitive direction of the inertial sensor 206 is set to a direction in which the displacement significantly occurs in the actual cooperative operation carried out by the positioning robot 100 and the working robot 200.

After the operation tool 205 is positioned at the target position P2 instructed by the external device, the displacement amount detecting portion 307 detects, based on the inertial force Q (indicating the acceleration or the angular velocity) of the inertial sensor 206, a displacement amount ΔP3 that is the amount of displacement of the operation tool 205 from the positioning reference position Pm corresponding to the target position P2. The displacement amount ΔP3 indicates a displacement between the current position of the operation tool 205 on control of the operation tool 205 (positioning reference position Pm) and an actual position P3 of the operation tool 205 which has been positioned at the target position P2. Moreover, in a case where the inertial force Q indicates the acceleration, the displacement amount ΔP3 of the operation tool 205 corresponding to the inertial force Q is obtained by the second order integration of the inertial force Q. Moreover, in a case where the inertial force Q indicates the angular velocity, the displacement amount ΔP3 of the operation tool 205 corresponding to the inertial force Q is obtained by the first order integration of the inertial force Q.

The target position correcting portion 308 corrects the target position P2 (positioning reference position Pm) of the operation tool 205, which is instructed by the external device and corresponds to the operation position of the work, to a corrected target position P2' which is set in consideration of the displacement amount ΔP3 of the operation tool 205 detected by the displacement amount detecting portion 307. Specifically, the target position correcting portion 308 calculates "the target position P2 (positioning reference position Pm)+the displacement amount ΔP3" and outputs this as the corrected target position P2'. In a case where the stop signal S is not input to the displacement amount detecting portion 307, the displacement amount ΔP3 is 0. Therefore, the target position correcting portion 308 does not correct the target position P2 and output the target position P2 as the corrected target position P2'.

As described above, in Embodiment 3, the inertial sensor 206 is attached to the tip end portion of the robot arm 210 of the working robot 200, and the displacement correction is carried out using the displacement amount ΔP3 that is the amount of displacement from the positioning reference position Pm, which corresponds to the operation position of the work and is the target position P2 of the operation tool 205, based on the inertial force Q detected by the inertial sensor 206. With this, the correction can be carried out while considering the deflection of the operation tool 205. Especially, in the spot welding system, a gun arm of a fixed electrode of the spot welding gun easily deflects by the gun welding pressure. Therefore, by attaching the inertial sensor 206 to the fixed electrode, the deflection of the gun arm can be corrected in addition to the displacement correction of the operation tool 205 using the displacement amount ΔP3.

Embodiment 4

In Embodiment 3, the inertial sensor 206 is attached to the tip end portion of the robot arm 210 of the working robot 200, the displacement amount ΔP3 that is the amount of displacement of the operation tool 205 from the positioning reference position Pm is detected based on the inertial force Q detected by the inertial sensor 206, and the displacement correction is carried out using the displacement amount ΔP3.

In Embodiment 4, the inertial sensor 206 is attached to the tip end portion of the robot arm 210 of the working robot 200, and the actual position P1 of the holding tool 105 of the positioning robot 100 is corrected to the actual position P3 of the operation tool 205 based on the inertial force Q detected by the inertial sensor 206. To be specific, unlike Embodiment 3, in the correction of a displacement amount ΔP2 in Embodiment 4, the operation tool 205 of the working robot 200 is not moved but the holding tool 105 of the positioning robot 100 is moved. With this, in the automatic operation system which requires a plurality of positioning robots 100, that is, in the automatic operation system in which the plurality of positioning robots 100 cooperatively convey the work to the positioning reference position Pn corresponding to the predetermined target position P0 of the working robot 200, in order to correct the displacement amounts of the holding tools 105 of the plurality of positioning robots 100, only one inertial sensor 206 may be attached to the working robot 200, and it becomes unnecessary to respectively provide the inertial sensors 106 at the plurality of positioning robots 100. Therefore, the automatic operation system can be realized at low cost.

Embodiment 5

In Embodiments 1 to 4, the cost of the system construction is reduced by attaching the inertial sensor (106 or 206) to the tip end portion of the robot arm 110 of the positioning robot 100 or the tip end portion of the robot arm 210 of the working robot 200. In Embodiment 5, the inertial sensors (106 and 206) are respectively attached to the tip end portion of the robot arm 110 of the positioning robot 100 and the tip end portion of the robot arm 210 of the working robot 200, and the displacement amount of the operation position which may be generated in the cooperative operation is divided by the positioning robot 100 and the working robot 200 (for example, each robot handles one half of the displacement amount). Then, the displacement correction is carried out by the operations of both the positioning robot 100 and the working robot 200. With this, the displacement correction can be carried out with high accuracy. In addition, the burden of each of the positioning robot 100 and the working robot 200 can be reduced.

The present invention has an excellent operational advantage of being able to detect and, correct, by a simple mechanism, the displacement which may be generated in the cooperative operation carried out by the positioning robot and the working robot. The present invention is useful when it is utilized in the automatic operation system in which the load and external force are applied to the holding tool of the positioning robot or the operation tool of the working robot in the cooperative operation.

What is claimed is:

1. A displacement correcting method for use in an automatic operation system, the automatic operation system including: 1) a positioning robot having a first robot arm and a holding tool provided at a tip end portion of the first robot arm, wherein the positioning robot conveys and positions the holding tool that holds a work at a positioning reference position that is a conveyance target position of the holding tool; 2) a working robot having a second robot arm and an operation tool provided at a tip end portion of the second robot arm, wherein the working robot carries out a predetermined operation with respect to the work at an operation position that is a predetermined target position of the working robot; 3) an inertial sensor provided at the tip end portion of the first robot arm, the tip end portion of the second robot arm, or the work held by the holding tool of the positioning robot; and 4) a robot control device that controls an operation of the positioning robot by executing the displacement correcting method, the method comprising:

a displacement amount detecting step of detecting a displacement amount of the holding tool from the positioning reference position based on an inertial force detected by the inertial sensor when the working robot carries out the predetermined operation with respect to the work; and a displacement correcting step of correcting, based on the detected displacement amount, the positioning reference position of the holding tool to a position of the holding tool before the holding tool is displaced, wherein in the displacement amount detecting step, the detection of the displacement amount is started at a time when a stop signal indicating that the holding tool is positioned at the positioning reference position is input.

2. The displacement correcting method in the automatic operation system according to claim 1, wherein the positioning robot is one of a plurality of positioning robots.

3. The displacement correcting method in the automatic operation system according to claim 1, wherein:

the inertial sensor is an acceleration sensor; and the displacement amount detecting step is a step of detecting, based on an acceleration in a translational direction or a rotational direction detected by the acceleration sensor, the displacement amount in the translational direction or the rotational direction from the positioning reference position of the holding tool up to a position of the holding tool after the holding tool is displaced.

4. The displacement correcting method in the automatic operation system according to claim 3, wherein:

the acceleration sensor is a sensor configured to detect the accelerations in directions of three dimensions; and the displacement amount detecting step is a step of detecting, based on the acceleration in the translational direction in each of the directions of three dimensions detected by the acceleration sensor, the displacement amount in the directions of three dimensions from the positioning reference position of the holding tool up to the position of the holding tool after the holding tool is displaced.

5. The displacement correcting method in the automatic operation system according to claim 1, wherein:

the inertial sensor is an angular velocity sensor; and the displacement amount detecting step is a step of detecting, based on an angular velocity in a rotational direction detected by the angular velocity sensor, the displacement amount in the rotational direction from the positioning reference position of the holding tool up to a position of the holding tool after the holding tool is displaced.

6. A displacement correcting method for use in an automatic operation system, the automatic operation system including: 1) a positioning robot having a first robot arm and a holding tool provided at a tip end portion of the first robot arm, wherein the positioning robot conveys and positions the holding tool that holds a work at a positioning reference position that is a conveyance target position of the holding tool; 2) a working robot having a second robot arm and an operation tool provided at a tip end portion of the second robot arm, wherein the working robot carries out a predetermined operation with respect to the work at an operation position that is a predetermined target position of the working robot; 3) an inertial sensor provided at the tip end portion of the first robot arm, the tip end portion of the second robot arm, or the work held by the holding tool of the positioning robot; and 4) a robot control device that controls an operation of the working robot by executing the displacement correcting method, the method comprising:

a displacement amount detecting step of detecting a displacement amount of the working robot from the operation position based on an inertial force detected by the inertial sensor when the working robot carries out the predetermined operation with respect to the work; and a displacement correcting step of correcting, based on the detected displacement amount, the operation position to a position of the working robot after the working robot is displaced, wherein in the displacement amount detecting step, the detection of the displacement amount is started at a time when a stop signal indicating that the operation tool is positioned at the operation position is input.

7. A non-transitory computer-readable storage device storing a displacement correcting program for use in an automatic operation system, the automatic operation system including: 1) a positioning robot having a first robot arm and a holding tool provided at a tip end portion of the first robot arm, wherein the positioning robot conveys and positions the holding tool that holds a work at a positioning reference position that is a conveyance target position of the holding tool; 2) a working robot having a second robot arm and an operation tool provided at a tip end portion of the second robot arm, wherein the working robot carries out a predetermined operation with respect to the work at an operation position that is a predetermined target position of the working robot; 3) an inertial sensor provided at the tip end portion of the first robot arm, the tip end portion of the second robot arm, or the work held by the holding tool of the positioning robot; and 4) a computer, wherein the displacement correcting program comprises instructions causing the computer to execute:

a displacement amount detecting step of detecting a displacement amount of the holding tool from the positioning reference position based on an inertial force detected by the inertial sensor when the working robot carries out the predetermined operation with respect to the work; and a displacement correcting step of correcting, based on the detected displacement amount, the positioning reference position of the holding tool to a position of the holding tool before the holding tool is displaced, wherein in the displacement amount detecting step, the detection of the displacement amount is started at a time when a stop signal indicating that the holding tool is positioned at the positioning reference position is input.

8. A non-transitory computer-readable storage device storing a displacement correcting program for use in an automatic operation system, the automatic operation system including: 1) a positioning robot having a first robot arm and a holding tool provided at a tip end portion of the first robot arm, wherein the positioning robot conveys and positions the holding tool that holds a work at a positioning reference position that is a conveyance target position of the holding tool; 2) a working robot having a second robot arm and an operation tool provided at a tip end portion of the second robot arm, wherein the working robot carries out a predetermined operation with respect to the work at an operation position that is a predetermined target position of the working robot; 3) an inertial sensor provided at the tip end portion of the first robot arm, the tip end portion of the second robot arm, or the work held by the holding tool of the positioning robot; and 4) a computer, wherein the displacement correcting program comprises instructions causing the computer to execute:

a displacement amount detecting step of detecting a displacement amount of the working robot from the operation position based on an inertial force detected by the inertial sensor when the working robot carries out the predetermined operation with respect to the work; and a displacement correcting step of correcting, based on the detected displacement amount, the operation position to a position of the working robot after the working robot is displaced, wherein in the displacement amount detecting step, the detection of the displacement amount is started at a time when a stop signal indicating that the operation tool is positioned at the operation position is input.

* * * * *